United States Patent
Coron

(10) Patent No.: US 7,162,033 B1
(45) Date of Patent: Jan. 9, 2007

(54) COUNTERMEASURE PROCEDURES IN AN ELECTRONIC COMPONENT IMPLEMENTING AN ELLIPTICAL CURVE TYPE PUBLIC KEY ENCRYPTION ALGORITHM

(75) Inventor: Jean-Sébastien Coron, Paris (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/937,396

(22) PCT Filed: Mar. 13, 2000

(86) PCT No.: PCT/FR00/00603

§ 371 (c)(1),
(2), (4) Date: Dec. 6, 2001

(87) PCT Pub. No.: WO00/59156

PCT Pub. Date: Oct. 5, 2000

(30) Foreign Application Priority Data

Mar. 26, 1999 (FR) .................................. 99 03921

(51) Int. Cl.
*H04L 9/30* (2006.01)
(52) U.S. Cl. .......................................... 380/30; 380/29
(58) Field of Classification Search ............ 380/28–30; 708/491, 492
See application file for complete search history.

(56) References Cited

U.S. PATENT DOCUMENTS 5,497,423 A * 3/1996 Miyaji .......................... 380/30
6,141,420 A * 10/2000 Vanstone et al. ............. 380/30
6,307,935 B1 * 10/2001 Crandall et al. ............. 380/28

OTHER PUBLICATIONS

Julio Lopez (Improved Algorithms for Elliptic Curve Arithmetic in GF (2n), 1998).*
Jerome A. Solinas ("An Improved Algorithm for Arithmetic on a Family of Elliptic Curves" 1998).*
Victor S. Miller ("Use of Elliptic Curves in cryptography" 1986).*
Michael J. Wiener ("Faster Attacks on Elliptic Curve Cryptosystems", 1998).*
Eric Von York (Elliptic Curve over Finite Fields, 1992 p. 23).*
Reyanld Lercier ("Finding good Random Elliptic curves for Cryptosystems defined over IF2n" 1997).*
Alfred J. Menezes ("Elliptic Curve Public key Cryptosystems" 1993 p. 13, 15).*
Menezes, A. J. et al, "*Elliptic Curve Cryptosystems and Their Implementation*"; Journal of Cryptology, New York, NY, vol. 6, No. 4, Sep. 1993, pp. 209-224.

* cited by examiner

*Primary Examiner*—Kim Vu
*Assistant Examiner*—Patel Nirav
(74) *Attorney, Agent, or Firm*—Buchanan Ingersoll & Rooney, PC

(57) ABSTRACT

Elliptical curve based cryptographic algorithms are public key algorithms offering a shorter calculation time and smaller key sizes in comparison with RSA. In a smart card type environment, these algorithms are vulnerable to differential power analysis (DPA) attacks. The disclosed invention provides a countermeasure procedure enabling positive action to be taken against DPA-type attacks. The countermeasure does not reduce performance and is easy to use in a smartcard type component.

13 Claims, No Drawings

COUNTERMEASURE PROCEDURES IN AN ELECTRONIC COMPONENT IMPLEMENTING AN ELLIPTICAL CURVE TYPE PUBLIC KEY ENCRYPTION ALGORITHM

This disclosure is based upon French Application No. 99/03921, filed on Mar. 26, 1999 and International Application No. PCT/FR00/00603, filed Mar. 13, 2000, which was published on Oct. 5, 2000 in a language other than English, the contents of which are incorporated herein by reference.

BACKGROUND OF THE INVENTION

The present invention relates to a countermeasure method in an electronic component using an elliptical curve type public key enciphering algorithm.

In the conventional model of secret key encryption, two persons wishing to communicate by means of a non-secure channel must first agree on a secret enciphering key K. The enciphering function and the deciphering function use the same key K. The drawback of the secret key enciphering system is that the said system requires the prior communication of the key K between the two persons by means of a secure channel, before any enciphered message is sent over the non-secure channel. In practice, it is generally difficult to find a perfectly secure communication channel, particularly if the distance separating the two persons is great. Secure channel means a channel for which it is impossible to know or modify the information passing over the said channel. Such a secure channel can be implemented by means of a cable connecting two terminals, possessed by the said two persons.

The concept of public key encryption was invented by Whitfield Diffie and Martin Hellman in 1976. Public key encryption makes it possible to resolve the problem of the distribution of the keys over a non-secure channel. The principle of public key encryption consists in using a pair of keys, a public enciphering key and a private deciphering key. It must be unfeasible from the calculation point of view to find the private deciphering key from the public enciphering key. A person A wishing to communicate information to a person B uses the public enciphering key of the person B. Only the person B possesses the private key associated with his public key. Only the person B is therefore capable of deciphering the message sent to him.

Another advantage of public key encryption over secret key encryption is that public key encryption allows authentication by the use of an electronic signature.

The first implementation of the public key enciphering scheme was developed in 1977 by Rivest, Shamir and Adleman, who invented the RSA enciphering system. RSA security is based on the difficulty of factorising a large number which is the product of two prime numbers.

Since then, many public key enciphering systems have been proposed, the security of which is based on different calculatory problems (this list is not exhaustive):

Merckle-Hellman backpack:

This enciphering system is based on the difficulty of the problem of the sum of subsets.

McEliece:

This enciphering system is based on the theory of algebraic codes. It is based on the problem of the decoding of linear codes.

El Gamal:

This enciphering system is based on the difficulty of the discrete logarithm in a finite field.

Elliptical curves:

The elliptical curve enciphering system constitutes a modification to existing cryptographic systems in order to apply them to the field of elliptical curves.

The use of elliptical curves in cryptographic systems was proposed independently by Victor Miller and Neal Koblitz in 1985. Actual applications of elliptical curves were envisaged early in the 1990s.

The advantage of cryptosystems based on elliptical curves is that they provide security equivalent to other cryptosystems but with smaller key sizes. This saving in key size entails a decrease in memory requirements and a reduction in calculation times, which makes the use of elliptical curves particularly suitable for applications of the smart card type.

An elliptical curve on a finite field $GF(q^n)$ (q being a prime number and n an integer) is the set of points (x,y) with x the X-axis and y the Y-axis belonging to $GF(q^n)$ the solution to the equation:

$$y^2=x^3+a*x+b$$

if q is greater than or equal to 3 and $$y^2+x*y=x^3+a*x^2+b$$

if q=2.

There are 2 methods for representing a point on an elliptical curve:

Firstly, affine coordinates representation; in this method, a point P on the elliptical curve is represented by its coordinates (x,y).

Secondly, projective coordinates representation.

The advantage of projective coordinates representation is that it makes it possible to avoid divisions in the finite field, the said divisions being the most expensive operations in terms of calculation time.

The most frequently used projective coordinates representation is that consisting of representing a point P on the elliptical curve by the coordinates (X,Y,Z), such that $x=X/Z$ and $y=Y/Z^3$.

The projective coordinates of a point are not unique since the triplet (X,Y,Z) and the triplet $(\lambda^2*X, \lambda^3*Y, \lambda*Z)$ represent the same point whatever the element $\lambda$ belonging to the finite field on which the elliptical curve is defined.

The two classes of curves which are most used in encryption are the following:

1) Curves defined on the finite field GF(p) (the set of integers modulo p, p being a prime number) having the equation:

$$y^2=x^3+a*x+b$$

2) Curves defined on the finite field $GF(2^n)$ having the equation $$y^2+x*y=x^3+a*x^2+b$$

For each of these two classes of curve, the point addition and point doubling operations are defined.

Point addition is the operation which, given two points P and Q, calculates the sum R=P+Q, R being a point on the curve whose coordinates are expressed by means of the coordinates of the points P and Q in accordance with formulae whose expression is given in the work "Elliptical curve public key cryptosystem" by Alfred J. Menezes.

Point doubling is the operation which, given a point P, calculates the point R=2*P, R being a point on the curve whose coordinates are expressed by means of the coordinates of the point P in accordance with the formulae whose expression is given in the work "Elliptical curve public key cryptosystem" by Alfred J. Menezes.

The point addition and point doubling operations make it possible to define a scalar multiplication operation: given a point P belonging to an elliptical curve and an integer d, the result of the scalar multiplication of P by d is the point Q such that Q=d*P=P+P+ . . . +P d times.

The security of encryption algorithms on elliptical curves is based on the difficulty of the problem of the discrete logarithm on elliptical curves, the said problem consisting, using two points Q and P belonging to an elliptical curve E, in finding, if such exists, an integer x such that Q=x*P.

There are many cryptographic algorithms based on the problem of the discrete logarithm. These algorithms are easily transposable to elliptical curves.

Thus it is possible to use algorithms providing authentication, confidentiality, integrity check and key exchange.

A point common to the majority of cryptographic algorithms based on elliptical curves is that they comprise as a parameter an elliptical curve defined on a finite field and a point P belonging to this elliptical curve. The private key is an integer d chosen randomly. The public key is a point on the curve Q such that Q=d*P. These cryptographic algorithms generally involve a scalar multiplication in the calculation of a point R=d*T, where d is the secret key.

In the above section, an enciphering algorithm based on an elliptical curve is described. This scheme is similar to the El Gamal enciphering scheme. A message m is enciphered as follows:

The cipher clerk chooses an integer k randomly and calculates the points k*P=(x1,y1) and k*Q=(x2,y2) on the curve, and the integer c=x2+m. The cipher of m is the triplet (x1,y1,c).

The deciphering clerk, who possesses d, deciphers m by calculating:

$(x'2, y'2) = d(x1, y1)$ and $m = c - x'2$

In order to effect the scalar multiplications necessary in the calculation methods described previously, several algorithms exist:

"Double and add" algorithm;
"Addition-subtraction" algorithm;
Algorithm with addition chains;
Algorithm with window;
Algorithm with signed representation.

This list is not exhaustive. The simplest algorithm and the one which is most used is the "double and add" algorithm. The "double and add" algorithm takes as its input a point P belonging to a given elliptical curve and an integer d. The integer d is denoted $d=(d(t),d(t-1), \ldots ,d(0))$, where $(d(t),d(t-1), \ldots ,d(0))$ is the binary representation of d, with d(t) the most significant bit and d(0) the least significant bit. The algorithm returns as an output the point Q=d.P.

The "double and add" algorithm includes the following three steps:

1) Initialising the point Q with the value P
2) For i ranging from t−1 to 0, executing:
2a) Replacing Q with 2Q
2b) If d(i)=1 replacing Q with Q+P
3) Returning Q.

It became clear that the implementation of a public key enciphering algorithm of the elliptical curve type on a smart card was vulnerable to attacks consisting of a differential analysis of current consumption making it possible to find the private deciphering key. These attacks are known as DPA attacks, the acronym for Differential Power Analysis. The principle of these DPA attacks is based on the fact that the current consumption of the microprocessor executing the instructions varies according to the data item being manipulated.

In particular, when an instruction is manipulating a data item in which a particular bit is constant, where the value of the other bits may vary, analysis of the current consumption related to the instruction shows that the mean consumption of the instruction is not the same according to whether the particular bit takes the value 0 or 1. The attack of the DPA type therefore makes it possible to obtain additional information on the intermediate data manipulated by the microprocessor of the card when a cryptographic algorithm is being executed. This additional information can in some cases reveal the private parameters of the deciphering algorithm, making the cryptographic system insecure.

In the remainder of this document a description is given of a method of DPA attack on an algorithm of the elliptical curve type performing an operation of the type consisting of the scalar multiplication of a point P by an integer d, the integer d being the secret key. This attack directly reveals the secret key d. It therefore seriously compromises the security of the implementation of elliptical curves on a smart card.

The first step of the attack is the recording of the current consumption corresponding to the execution of the "double and add" algorithm described previously for N distinct points P(1), . . . , P(N). In an algorithm based on elliptical curves, the microprocessor of the smart card will perform N scalar multiplications d.P(1), . . . ,d.P(N)

For clarity of the description of the attack, the first step is to describe a method for obtaining the value of the bit d(t−1) of the secret key d, where (d(t),d(t−1), . . . ,d(0)) is the binary representation of d, with d(t) the most significant bit and d(0) the least significant bit. Next the description of an algorithm which makes it possible to find the value of d is given.

The points P(1) to P(N) are grouped together according to the value of the last bit of the abscissa of 4.P, where P designates one of the points P(1) to P(N). The first group consists of the points P such that the last bit of the abscissa of 4.P is equal to 1.

The second group consists of the points P such that the last bit of the abscissa of 4.P is equal to 0. The mean of the current consumptions corresponding to each of the two groups is calculated, and the difference curve between these two means is calculated.

If the bit d(t−1) of d is equal to 0, then the scalar multiplication algorithm previously described calculates and stores in memory the value of 4.P. This means that, when the algorithm is executed in a smart card, the microprocessor of the card will actually calculate 4.P. In this case, in the first message group, the last bit of the data item manipulated by the microprocessor is always at 1, and in the second message group the last bit of the data item manipulated is always at 0. The mean of the current consumptions corresponding to each group is therefore different. There therefore appears, in the difference curve between the two means, a differential current consumption peak.

If on the other hand the bit d(t−1) of d is equal to 1, the exponentiation algorithm described previously does not calculate the point 4.P. When the algorithm is executed by the smart card, the microprocessor therefore never manipulates the data item 4.P. Therefore no differential consumption peak appears.

This method therefore makes it possible to determine the value of the bit d(t−1) of d.

The algorithm described in the following section is a generalisation of the previous algorithm. It makes it possible to determine the value of the secret key d.

The input is defined by N points denoted P(1) to P(N) corresponding to N calculations performed by the smart card, and the output by an integer h.

The said algorithm is implemented as follows in three steps.

1) Executing h=1;
2) For i ranging from t−1 to 1, executing:
2)1) Classifying the points P(1) to P(N) according to the value of the last bit of the abscissa of (4*h).P;
2)2) Calculating the current consumption mean for each of the two groups;
2)3) Calculating the difference between the two means;
2)4) If the difference shows a differential consumption peak, doing h=h*2; otherwise doing h=h*2+1;
3) Returning h.

The above algorithm supplies an integer h such that d=2*h or d=2*h+1. In order to obtain the value of d, it then suffices to test the two possible hypotheses.

The attack of the DPA type described therefore makes it possible to find the private key d.

DESCRIPTION OF THE INVENTION

The method of the invention consists in devising of a countermeasure for guarding against the DPA attack described above. This countermeasure uses the representation of the points on the elliptical curve in projective coordinates.

As explained above, the representative of a point in projective coordinates is not unique. If the finite field on which the elliptical curve is defined comprises n elements, it is possible to choose one representative amongst n−1 possible ones.

By choosing a random representative of a point on which the calculation is carried out, the intermediate values of the calculation themselves become random and therefore unpredictable from outside, which makes the DPA attack described above impossible.

The countermeasure method consists of a modification of the elliptical curve point doubling and point addition operations defined on the finite fields GF(p) for p prime and GF(2^n). The modification of the point addition and point doubling operations on elliptical curves defined on the finite fields GF(p) for p prime and GF(2^n) apply whatever the algorithm used for performing these operations.

The countermeasure method also consists of the definition of four variants in the scalar multiplication operation. These four variants apply whatever the algorithm used for performing the scalar multiplication operation.

In this section, a description is given of the modification of the point doubling algorithm for an elliptical curve defined on the finite field GF(p), where p is a prime number. The elliptical curve is therefore defined by the following equation:

$$y^2 = x^3 + a*x + b$$

where a and b are integer parameters fixed at the start.

The projective coordinates of the point Q=(X2,Y2,Z2) such that Q=2.P with P=(X1,Y1,Z1) are calculated by the following method in 6 steps. In each of the steps, the calculations are effected modulo p.

1) Calculate M=3*X1^2+a*Z1^4;
2) Calculate Z2=2*Y1*Z1;
3) Calculate S=4*X1*Y1^2;
4) Calculate X2=M^2−2*S;
5) Calculate T=8*Y1^4;
6) Calculate Y2=M*(S−X2)−T.

The countermeasure method consists of a modification of the above method.

The new method of point doubling for an elliptical curve defined on the finite field GF(p) consists of the following 8 steps:

1) Drawing at random an integer λ such that 0<λ<p;
2) Calculate X'1=λ^2*X1, Y'1=λ^3*Y1 and Z'1=λ*Z1;
3) Calculate M=3*X'1^2+a*Z'1^4;
4) Calculate Z2=2*Y'1*Z'1;
5) Calculate S=4*X'1*Y'1^2;
6) Calculate X2=M^2−2*S;
7) Calculate T=8*Y'1^4;
8) Calculate Y2=M*(S−X2)−T.

More generally, the countermeasure method applies whatever the method (hereinafter denoted A) used for performing the point doubling operation. The method A is replaced by the method A' in 3 steps:

Input: a point P=(X1,Y1,Z1) represented in projective coordinates.

Output: a point Q=(X2,Y2,Z2) represented in projective coordinates such that Q=2.P.

1) Drawing at random an integer λ such that 0<λ<p;
2) Calculating X'1=λ^2*X1, Y'1=λ^3*Y1 and Z'1=λ*Z1, X'1, Y'1 and Z'1 defining the coordinates of the point P'=(X'1,Y'1,Z'1);
3) Calculating Q=2*P' by means of the algorithm A.

The variables manipulated during the execution of the method A' being random, the previously described DPA attack no longer applies.

In this paragraph, a description is given of the modification to the point addition algorithm for an elliptical curve defined on the finite field GF(p), where p is a prime number.

The projective coordinates of the point R=(X2,Y2,Z2) such that R=P+Q with P=(X0,Y0,Z0) and Q=(X1,Y1,Z1) are calculated by the following method in 12 steps. In each of the steps, the calculations are carried out modulo p.

1) Calculate U0=X0*Z1^2;
2) Calculate S0=Y0*Z1^3;
3) Calculate U1=X1*Z0^2;
4) Calculate S1=Y1*Z0^3;
5) Calculate W=U0−U1;
6) Calculate R=S0−S1;
7) Calculate T=U0+U1;
8) Calculate M=S0+S1;
9) Calculate Z2=Z0*Z1*W;
10) Calculate X2=R^2−T*W^2;
11) Calculate V=T*W^2−2*X2;
12) Calculate 2*Y2=V*R−M*W^3.

The countermeasure method consists of a modification of the previous method. The new method of point addition for an elliptical curve defined on the finite field GF(p) consists of the following 16 steps:

1) Drawing at random an integer λ such that 0<λ<p;
2) Replacing X0 with λ^2*X0, Y0 with λ^3*Y0 and Z0 with λ*Z0;
3) Drawing at random an integer μ such that 0<μ<p;
4) Replacing X1 with μ^2*X1, Y1 with μ^3*Y1 and Z1 with μ*Z1;
5) Calculate U0=X0*Z1^2;
6) Calculate S0=Y0*Z1^3;
7) Calculate U1=X1*Z0^2;

8) Calculate $S1=Y1*Z0^3$;
9) Calculate $W=U0-U1$;
10) Calculate $R=S0-S1$;
11) Calculate $T=U0+U1$;
12) Calculate $M=S0+S1$;
13) Calculate $Z2=Z0*Z1*W$;
14) Calculate $X2=R^2-T*W^2$;
15) Calculate $V=T*W^2-2*X2$;
16) Calculate $2*Y2=V*R-M*W^3$.

More generally, the countermeasure method applies whatever the method (hereinafter denoted A) used for performing the point addition operation. The method A is replaced by the method A' in 5 steps:

Input: two points $P=(X0,Y0,Z0)$ and $Q=(X1,Y1,Z1)$ represented in projective coordinates.

Output: the point $R=(X2,Y2,Z2)$ represented in projective coordinates such that $R=P+Q$.

1) Drawing at random an integer $\lambda$ such that $0<\lambda<p$;
2) Replacing X0 with $\lambda^2*X0$, Y0 with $\lambda^3*Y0$ and Z0 with $\lambda*Z0$;
3) Drawing at random an integer $\mu$ such that $0<\mu<p$;
4) Replacing X1 with $\mu^2*X1$, Y1 with $\mu^3*Y1$ and Z1 with $\mu*Z1$;
5) Calculating $R=P+Q$ by means of algorithm A.

The variables manipulated during the execution of the method A' being random, the previously described DPA attack no longer applies.

In this section, a description is given of the modification of the point doubling algorithm for an elliptical curve defined on the finite field $GF(2^n)$. The elliptical curve is therefore defined by the following equation:

$$y^2+x*y=x^3+a*x^2+b$$

where a and b are parameters belonging to the finite field $GF(2^n)$ fixed at the start. c is defined by the equation:

$$c=b^{(2^{(n-2)})}.$$

The projective coordinates of the point $Q=(X2,Y2,Z2)$ such that $Q=2.P$ with $P=(X1,Y1,Z1)$ are calculated by the following method in 4 steps. In each of the steps, the calculations are carried out in the finite field $GF(2^n)$.

1) Calculate $Z2=X1*Z1^2$;
2) Calculate $X2=(X1+c*Z1^2)^4$;
3) Calculate $U=Z2+X1^2+Y1*Z1$;
4) Calculate $Y2=X1^4*Z2+U*X2$.

The countermeasure method consists of a modification of the previous method. The new point doubling method for an elliptical curve defined on the finite field $GF(2^n)$ consists of the following 6 steps:

1) Drawing at random a non-zero element $\lambda$ of $GF(2^n)$;
2) Calculate $X'1=\lambda^2*X1$, $Y'1=\lambda^3*Y1$, $Z'1=\lambda*Z1$;
3) Calculate $Z2=X'1*Z'1^2$;
4) Calculate $X2=(X'1+c*Z'1^2)^4$;
5) Calculate $U=Z2+X'1^2+Y'1*Z'1$;
6) Calculate $Y2=X'1^4*Z2+U*X2$.

More generally, the countermeasure method applies whatever the method (hereinafter denoted A) used for performing the point doubling operation. The method A is replaced by the method A' in 3 steps:

Input: a point $P=(X1,Y1,Z1)$ represented in projective coordinates.

Output: a point $Q=(X2,Y2,Z2)$ represented in projective coordinates such that $Q=2.P$.

1) Drawing at random a non-zero element $\lambda$ of $GF(2^n)$;
2) Calculating $X'1=\lambda^2*X1$, $Y'1=\lambda^3*Y1$, $Z'1=\lambda*Z1$, $X'1$, $Y'1$ and $Z'1$ defining the coordinates of the point $P'=(X'1,Y'1,Z'1)$;
3) Calculation of $Q=2.P'$ using the algorithm A. The variables manipulated during the execution of the method A' being random, the previously described DPA attack no longer applies.

In this section, a description is given of the modification of the point addition algorithm for an elliptical curve defined on the finite field $GF(2^n)$.

The projective coordinates of the point $R=(X2,Y2,Z2)$ such that $R=P+Q$ with $P=(X0,Y0,Z0)$ and $Q=(X1,Y1,Z1)$ are calculated by the following method in 12 steps. In each of the steps, the calculations are carried out in the finite field $GF(2^n)$.

1) Calculate $U0=X0*Z1^2$;
2) Calculate $S0=Y0*Z1^3$;
3) Calculate $U1=X1*Z0^2$;
4) Calculate $S1=Y1*Z0^3$;
5) Calculate $W=U0+U1$;
6) Calculate $R=S0+S1$;
7) Calculate $L=Z0*W$;
8) Calculate $V=R*X1+L*Y1$;
9) Calculate $Z2=L*Z1$;
10) Calculate $T=R+Z2$;
11) Calculate $X2=a*Z2^2+T*R+W^3$;
12) Calculate $Y2=T*X2+V*L^2$.

The countermeasure method consists of a modification to the previous method. The new point addition method for an elliptical curve defined on the finite field $GF(2^n)$ consists of the following 14 steps:

1) Drawing at random a non-zero element $\lambda$ of $GF(2^n)$;
2) Replacing X0 with $\lambda^2*X0$, Y0 with $\lambda^3*Y0$ and Z0 with $\lambda*Z0$;
3) Drawing at random a non-zero element $\mu$ of $GF(2^n)$;
4) Replacing X1 with $\mu^2*X1$, Y1 with $\mu^3*Y1$ and Z1 with $\mu*Z1$;
5) Calculate $U0=X0*Z1^2$;
6) Calculate $S0=Y0*Z1^3$;
7) Calculate $U1=X1*Z0^2$;
8) Calculate $S1=Y1*Z0^3$;
9) Calculate $W=U0+U1$;
10) Calculate $R=S0+S1$;
11) Calculate $L=Z0*W$;
12) Calculate $V=R*X1+L*Y1$;
13) Calculate $Z2=L*Z1$;
14) Calculate $T=R+Z2$;
15) Calculate $X2=a*Z2^2+T*R+W^3$;
16) Calculate $Y2=T*X2+V*L^2$.

More generally, the countermeasure method applies whatever the method (hereinafter denoted A) used for performing the point addition operation. The method A is replaced by the method A' in 5 steps:

Input: two points $P=(X0,Y0,Z0)$ and $Q=(X1,Y1,Z1)$ represented as projective coordinates.

Output: the point $R=(X2,Y2,Z2)$ represented as projective coordinates such that $R=P+Q$.

1) Drawing at random a non-zero element $\lambda$ of $GF(2^n)$;
2) Replacing X0 with $\lambda^2*X0$, Y0 with $\lambda^3*Y0$ and Z0 with $\lambda*Z0$;
3) Drawing at random a non-zero element $\mu$ of $GF(2^n)$;
4) Replacing X1 with $\mu^2*X1$, Y1 with $\mu^3*Y1$ and Z1 with $\mu*Z1$;
5) Calculating $R=P+Q$ by means of the algorithm A.

The variables manipulated during the execution of the method A' being random, the previously described DPA attack no longer applies.

The countermeasure method also consists in defining four variants in the scalar multiplication operation. The scalar multiplication operation uses the point doubling operation denoted Do and the point addition operation denoted Ad. The modified point doubling operation described above is denoted Do' and the modified point addition operation described above is denoted Ad'.

In this section a description is given of the first variation of the modification to the scalar multiplication operation. The first variant consists of making random the representation of a point at the start of the calculation method. In the case of the use of the "double and add" algorithm, the modified scalar multiplication method is the following one in 5 steps. The method takes as an input a point P and an integer d. The integer d is denoted $d=(d(t),d(t-1),\ldots,d(0))$, where $(d(t),d(t-1),\ldots,d(0))$ is the binary representation of d, with $d(t)$ the most significant bit and $d(0)$ the least significant bit. The algorithm returns the point Q=d.P as an output.

This first variant is executed in five steps.
1) Initialising the point Q with the value P;
2) Replacing Q with 2.Q using the method Do';
3) If $d(t-1)=1$ replacing Q with Q+P using the method Ad;
4) For i ranging from t−2 to 0 executing:
4a) Replacing Q with 2Q;
4b) If $d(i)=1$, replacing Q with Q+P;
5) Returning Q.

More generally, the method of the first variant described previously applies to the scalar multiplication operation whatever the method (hereinafter denoted A) used for effecting the calculation of the scalar multiplication. The method A uses the previously defined operations Do and Ad.

The first variant of the countermeasure consists in replacing the first operation Do with Do' defined previously.

The first variant therefore ensures that the intermediate variables manipulated during the scalar multiplication operation are random. This makes the previously described DPA attack inapplicable.

In this paragraph the second variant of modification of the scalar multiplication operation is described.

The second variant consists in making random the representation of a point at the start of the calculation method and at the end of the calculation method. In the case of the use of the "double and add" algorithm, the modified scalar multiplication method is the following one in 7 steps. The method takes as an input a point P and an integer d. The integer d is denoted $d=(d(t),d(t-1),\ldots,d(0))$, where $(d(t),d(t-1),\ldots,d(0))$ is the binary representation of d, with $d(t)$ the most significant bit and $d(0)$ the least significant bit. The algorithm returns the point Q=d.P as an output.

This second variant is executed in seven steps:
1) Initialising the point Q with the value P;
2) Replacing Q with 2.Q using the method Do';
3) If $d(t-1)=1$, replacing Q with Q+P using the method Ad;
4) For i ranging from t−2 to 1, executing:
4a) Replacing Q with 2Q;
4b) If $d(i)=1$, replacing Q with Q+P;
5) Replacing Q with 2.Q using the method Do';
6) If $d(0)=1$, replacing Q with Q+P using the method Ad;
7) Returning Q.

More generally, the method of the second variant described previously applies to the scalar multiplication operation whatever the method (hereinafter denoted A) used for effecting the calculation of this scalar multiplication. The method A uses the operations Do and Ad defined previously. The second variant of the countermeasure consists of replacing the first operation Do with Do' defined previously and the last operation Do with Do'.

The second variant therefore ensures that the intermediate variables manipulated during the scalar multiplication operation are random. The advantage of the second variant is increased security against DPA attacks at the end of the scalar multiplication algorithm. In particular, the second variant makes the previously described DPA attack inapplicable.

In this section, the third variant of the modification of the scalar multiplication operation is described.

The third variant consists in making random the representation of each of the points manipulated during the scalar multiplication method. In the case of the use of the "double and add" algorithm, the modified scalar multiplication method is the following one in 4 steps. The method takes as an input a point P and an integer d. The integer d is denoted $d=(d(t),d(t-1),\ldots,d(0))$, where $(d(t),d(t-1),\ldots,d(0))$ is the binary representation of d, with $d(t)$ the most significant bit and $d(0)$ the least significant bit. The algorithm returns the point Q=d.P as an output.

This third variant is executed in three steps:
1) Initialising the point Q with the point P;
2) For i ranging from t−2 to 0, executing:
2a) Replacing Q with 2Q using the method Do';
2b) If $d(i)=1$, replacing Q with Q+P using the method Ad';
3) Returning Q.

More generally, the method of the third variant described above applies to the scalar multiplication operation whatever the method (hereinafter denoted A) used for performing the calculation of the scalar multiplication. The method A uses the previously defined operations Do and Ad.

The third variant of the countermeasure consists of replacing all the operations Do with Do' and Ad with Ad'.

The third variant therefore ensures that the intermediate variables manipulated during the scalar multiplication operation are random. The advantage of the third variant compared with the second variant is increased security against DPA attacks on the intermediate operations of the scalar multiplication method. In particular, the third variant makes the previously described DPA attack inapplicable.

In this section the fourth variant of modification of the scalar multiplication operation is described. The fourth variant consists in making random the representation of each of the points manipulated during the scalar multiplication method. The fourth variant is a modification of the third variant through the use of a counter, the said counter making it possible to determine the steps of the scalar multiplication algorithm for which the representation of a point is made random. For this purpose a security parameter T is defined. In practice T=5 can be taken. In the case of the use of the "double and add" algorithm, the modified scalar multiplication method is the following one in 4 steps. The method takes as an input a point P and an integer d.

The integer d is denoted $d=(d(t),d(t-1),\ldots,d(0))$, where $(d(t),d(t-1),\ldots,d(0))$ is the binary representation of d, with $d(t)$ the most significant bit and $d(0)$ the least significant bit. The algorithm returns as an output the point Q=d.P.

The fourth variant is executed in three steps:
1) Initialising the point Q with the point P.
2) Initialising the counter co to the value T.
3) For i ranging from t−1 to 0, executing:
3a) Replacing Q with 2Q using the method Do if co is different from 0, otherwise using the method Do'.
3b) If $d(i)=1$, replacing Q with Q+P using the method Ad.
3c) If co=0 then reinitialising the counter co to the value T.

3d) Decrementing the counter co.

3) Returning Q.

More generally, the method of the third variant described above applies to the scalar multiplication operation whatever the method (hereinafter denoted A) used for effecting the calculation of the scalar multiplication. The method A uses the previously defined operations Do and Ad.

The variant of the third countermeasure consists in initialising a counter co to the value T. The operation Do is replaced by the operation Do' if the value of the counter is 0.

After each execution of the operations Do or Do', the counter is reinitialised to the value T if it has reached the value 0; it is then decremented.

The fourth variant therefore ensures that the intermediate variables manipulated during the scalar multiplication operation are random. The advantage of the fourth variant compared with the third variant is a greater speed of execution. The fourth variant makes the previously described DPA attack inapplicable.

The application of one of the four variants described above therefore makes it possible to protect any cryptographic algorithm based on elliptical curves against the previously described DPA attack.

The invention claimed is:

1. A countermeasure method in an electronic component implementing an elliptical curve type public key encryption algorithm, wherein a point P on the elliptical curve is represented by the projective coordinates (X, Y, Z) such that $x=X/Z$ and $y=Y/Z^3$, x and y being the coordinates of the point on the elliptical curve in terms of affine coordinates, said curve comprising n elements and being defined on a finite field GF(p), where p is a prime number and the curve has the equation $y^2=x^3+a*x+b$, or defined on a finite field GF($2^n$), with the curve having the equation $y^2+x*y=x^3+a*x^2+b$, where a and b are integer parameters, the method comprising the steps of:

1) Drawing at random an integer $\lambda$ such that $0<\lambda<p$;
2) For a point P represented by projective coordinates (X1, Y1, Z1), calculating $X'1=\lambda^2*X1$, $Y'1=\lambda^3*Y1$ and $Z'1=\lambda*Z1$, to define the coordinates of the point P'=(X'1, Y'1, Z'1);
3) Calculating an output point Q=2*P' that is represented by projective coordinates (X2, Y2, Z2); and
4) Performing a public key cryptographic operation using a key which is based upon the value Q.

2. A countermeasure method according to claim 1, wherein the elliptical curve is defined on the finite field GF(p), and the step of calculating Q includes the following steps:

Calculate $M=3*X'1^2+a*Z'1^4$;
Calculate $Z2=2*Y'1*Z'1$;
Calculate $S=4*X'1*Y'1^2$;
Calculate $X2=M^2-2*S$;
Calculate $T=8*Y'1^4$; and
Calculate $Y2=M*(S-X2)-T$.

3. A countermeasure method according to claim 1, wherein the elliptical curve is defined on the finite field GF(p), and further including the following steps:

Drawing at random a non-zero integer $\lambda$ of GF($2^n$);
Replacing X0 with $\lambda^2*X0$, Y0 with $\lambda^3*Y0$ and Z0 with $\lambda*Z0$;
Drawing at random a non-zero integer $\lambda$ of GF($2^n$);
Replacing X1 with $\lambda^2*X1$, Y1 with $\lambda^3*Y1$ and Z1 with $\lambda*Z1$; and Calculating R=P+Q.

4. A countermeasure method according to claim 1, further including the calculation of the projective coordinates of the point R=(X2,Y2,Z2) such that R=P+Q with P=(X0,Y0,Z0) and Q=(X1,Y1,Z1) according to the following steps, with the calculations in each of the steps being effected modulo p:

Replacing X0 with $\lambda^2*X0$, Y0 with $\lambda^3*Y0$ and Z0 with $\lambda*Z0$;
Drawing at random an integer $\mu$ such that $0<\mu<p$;
Replacing X1 with $\lambda^2*X1$, Y1 with $\lambda^3*Y1$ and Z1 with $\lambda*Z1$;
Calculate $U0=X0*Z1^2$;
Calculate $S0=Y0*Z1^3$;
Calculate $U1=X1*Z0^2$;
Calculate $S1=Y1*Z0^3$;
Calculate $W=U0-U1$;
Calculate $R=S0-S1$;
Calculate $T=U0+U1$;
Calculate $M=S0+S1$;
Calculate $Z2=Z0*Z1*W$;
Calculate $X2=R^2-T*W^2$;
Calculate $V=T*W^2-2*X2$; and
Calculate $2*Y2=V*R-M*W^3$.

5. A countermeasure method according to claim 1, wherein the elliptical curve is defined on the finite field GF($2^n$), where n is a prime number, and the step of drawing a random integer comprises Drawing at random a non-zero element $\lambda$ of GF($2^n$).

6. A countermeasure method according to claim 5, further including the following steps:

Calculate $Z2=X'1*Z'1^2$;
Calculate $X2=(X'1+c*Z'1^2)^4$;
Calculate $U=Z2+X'1^2+Y'1*Z'1$; and
Calculate $Y2=X'1^4*Z2+U*X2$.

7. A countermeasure method according to claim 5, further including the following steps, with the calculation in each of the steps being carried out modulo p:

For an input point P=(X0, Y0, Z0), replacing X0 with $\lambda^2*X0$, Y0 with $\lambda^3*Y0$ and Z0 with $\lambda*Z0$;
3) Drawing at random a non-zero element $\lambda$ of GF($2^n$);
4) For an input point Q=(X1, Y1, Z1), replacing X1 with $\mu^2*X1$, Y1 with $\mu^3*Y1$ and Z1 with $\mu*Z1$; and
5) Calculating R=P+Q.

8. A countermeasure method according to claim 5, further including the following steps:

For an input point P=(X0, Y0, Z0), replacing X0 with $\lambda^2*X0$, Y0 with $\lambda^3*Y0$ and Z0 with $\lambda*Z0$;
Drawing at random a non-zero element $\mu$ of GF($2^n$);
For an input point Q=(X1, Y1, Z1) replacing X1 with $\mu^2*X1$, Y1 with $\mu^3*Y1$ and Z1 with $\mu*Z1$;
Calculate $U0=X0*Z1^2$;
Calculate $S0=Y0*Z1^3$;
Calculate $U1=X1*Z0^2$;
Calculate $S1=Y1*Z0^3$;
Calculate $W=U0+U1$;
Calculate $R=S0+S1$;
Calculate $L=Z0*W$;
Calculate $V=R*X1+L*Y1$;
Calculate $Z2=L*Z1$;
Calculate $T=R+Z2$;
Calculate $X2=a*Z2^2+T*R+W^3$; and
Calculate $Y2=T*X2+V*L^2$.

9. A countermeasure method according to claim 1, further including the process of randomizing the representation of a point at the start of the calculation by the use of a "double and add" algorithm, taking as an input a point P and an integer d, the integer d being denoted d=(d(t),d(t−1), ..., d(0)), where (d(t),d(t−1), ...,d(0)) is the binary representation of d, with d(t) the most significant bit and d(0) the least significant bit, the algorithm returning as an output the point Q=d.P, according to the following steps:
  1) Initialising the point Q with the value P;
  2) Replacing Q with 2.Q;
  3) If d(t−1)=1 replacing Q with Q+P;
  4) For i ranging from t−2 to 0 executing the steps of:
  4a) Replacing Q with 2Q;
  4b) If d(i)=1, replacing Q with Q+P; and
  5) Returning Q.

10. A countermeasure method according to claim 1, further including the process of randomizing the representation of a point at the start of the calculation method and at the end of the calculation method, using a "double and add" algorithm, taking as an input a point P and an integer d, the integer d being denoted d=(d(t),d(t−1), ... ,d(0)), where (d(t),d(t−1), ...,d(0)) is the binary representation of d, with d(t) the most significant bit and d(0) the least significant bit, the algorithm returning as an output the point Q=d.P, according to the following steps:
  1) Initialising the point Q with the value P;
  2) Replacing Q with 2.Q;
  3) If d(t−1)=1, replacing Q with Q+P;
  4) For i ranging from t−2 to 1, executing the steps of:
  4a) Replacing Q with 2Q;
  4b) If d(i)=1, replacing Q with Q+P;
  5) Replacing Q with 2.Q;
  6) If d(0)=1, replacing Q with Q+P and;
  7) Returning Q.

11. A countermeasure method according to claim 1, further including the following steps:
  1) Initialising the point Q with the point P;
  2) For i ranging from t−2 to 0, executing the steps of:
  2a) Replacing Q with 2Q;
  2b) If d(i)=1, replacing Q with Q+P; and
  3) Returning Q.

12. A countermeasure method according to claim 1, further including the following steps:
  1) Initialising the point Q with the point P,
  2) Initialising a counter co to the value T,
  3) For i ranging from t−1 to 0, executing the steps of:
  3a) Replacing Q with 2Q using a first method if co is different from 0, otherwise using method;
  3b) If d(i)=1, replacing Q with Q+P;
  3c) If co=0 then reinitialising the counter co to the value T;
  3d) Decrementing the counter co; and
  4 Returning Q.

13. The method of claim 1, wherein said electronic component is a smart card.

* * * * *